United States Patent
Wu et al.

(10) Patent No.: US 12,126,182 B2
(45) Date of Patent: Oct. 22, 2024

(54) CHARGING DEVICE, ELECTRONIC DEVICE AND CHARGING SYSTEM

(71) Applicant: BEIJING XIAOMI MOBILE SOFTWARE CO., LTD., Beijing (CN)

(72) Inventors: Kaiqi Wu, Beijing (CN); Yanteng Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 789 days.

(21) Appl. No.: 17/240,359

(22) Filed: Apr. 26, 2021

(65) Prior Publication Data
US 2022/0069621 A1   Mar. 3, 2022

(30) Foreign Application Priority Data
Aug. 31, 2020   (CN) .......................... 202010899588.4

(51) Int. Cl.
*H02J 50/10*   (2016.01)
*H02J 50/00*   (2016.01)

(52) U.S. Cl.
CPC ............. *H02J 50/005* (2020.01); *H02J 50/10* (2016.02); *H02J 2310/22* (2020.01)

(58) Field of Classification Search
USPC .................... 320/106, 107, 108, 109, 110
See application file for complete search history.

(56) References Cited

U.S. PATENT DOCUMENTS

| 2019/0006893 | A1 | 1/2019 | Shaw et al. | |
| 2019/0363565 | A1* | 11/2019 | Graham | H01F 27/36 |
| 2021/0099031 | A1* | 4/2021 | Jol | H02J 50/90 |

FOREIGN PATENT DOCUMENTS

| EP | 3336617 A1 | 6/2018 |
| KR | 20190038445 A | 4/2019 |
| WO | WO 2009105615 A2 | 8/2009 |
| WO | WO 2011156768 A2 | 12/2011 |

OTHER PUBLICATIONS

European Patent Application No. 21169467.4, extended search and opinion dated Sep. 23, 2021, 9 pages.
European patent application No. 21169467.4 Search Report dated Jul. 15, 2024, 8 pages.

* cited by examiner

*Primary Examiner* — Brian Ngo
(74) *Attorney, Agent, or Firm* — Cozen O'Connor

(57) ABSTRACT

A charging device, an electronic device, and a charging system includes a charging module and a plurality of magnetically attractable components. The charging device includes the plurality of magnetically attractable components, one or more of the magnetically attractable components form a plurality of sets of positioning modules, and each set of positioning modules forms one positioning structure of a plurality of positioning structures, such that the charging device includes a plurality of sets of positioning structures. In the process of using the charging device and the electronic device cooperatively to achieve charging, the charging device including the plurality of sets of positioning structures can be positioned to match with various types of electronic devices, thereby improving the compatibility of the charging device.

17 Claims, 12 Drawing Sheets

CHARGING DEVICE, ELECTRONIC DEVICE AND CHARGING SYSTEM

CROSS-REFERENCE TO RELATED APPLICATIONS

This application is based upon and claims priority to Chinese Patent Application Serial No. 202010899588.4, filed on Aug. 31, 2020, the contents of which are incorporated herein by reference as if set forth in its entirety.

TECHNICAL FIELD

The present disclosure generally relates to the field of electronic technology, and more particularly, to a charging device, an electronic device, and a charging system.

BACKGROUND

Wireless charging technology is widely used in mobile phones and other electronic products. In a wireless charging process, wireless charging transmitting coils of a charging transmitter and wireless charging receiving coils of a charging receiver cooperate to realize the wireless charging of mobile phones and other electronic products.

In the related art, there various types of electronic products using wireless charging technology such as charging docks and mobile phones, and wireless charging transmitters and wireless charging receivers usually have a one-to-one matching relationship. Charging modules between different types of charging transmitters and charging receivers cannot be aligned structurally, resulting in failure of the wireless charging process.

SUMMARY

Embodiments of a first aspect of the present disclosure provide a charging device for use in conjunction with an electronic device. The electronic device includes a charging cooperation module, and the charging device includes a charging module and a plurality of magnetically attractable components. One or more of the plurality of magnetically attractable components form a plurality of sets of positioning modules, and each set of positioning modules forms one positioning structure of a plurality of positioning structures; each positioning structure can be positioned to cooperate with at least one type of electronic devices, to allow a position of the charging module to correspond to a position of the charging cooperation module.

Embodiments of a second aspect of the present disclosure provide an electronic device for use in conjunction with a charging device or another electronic device. The charging device includes a charging module, and the electronic device includes a charging cooperation module and a plurality of magnetically attractable cooperation components. One or more of the magnetically attractable cooperation components form a plurality of sets of positioning cooperation modules, and each set of positioning cooperation modules forms one positioning cooperation structure of a plurality of positioning cooperation structures; each positioning cooperation structure can be positioned to cooperate with at least one type of charging devices or at least one type of electronic devices, to allow a position of the charging cooperation module to correspond to a position of the charging module, or allow positions of two charging cooperation modules to correspond to each other.

Embodiments of a third aspect of the present disclosure provide a charging system. The charging system includes the above charging device described; and/or the above electronic device. The charging device includes a charging module and a plurality of magnetically attractable components; and the electronic device includes a charging cooperation module and a plurality of magnetically attractable cooperation components. One or more of the plurality of magnetically attractable components form a plurality of sets of positioning modules, and each set of positioning modules forms one positioning structure of a plurality of positioning structures; each positioning structure can be positioned to cooperate with at least one type of electronic devices, to allow a position of the charging module to correspond to a position of the charging cooperation module. One or more of the magnetically attractable cooperation components form a plurality of sets of positioning cooperation modules, and each set of positioning cooperation modules forms one positioning cooperation structure of a plurality of positioning cooperation structures; each positioning cooperation structure can be positioned to cooperate with at least one type of charging devices or at least one type of electronic devices, to allow the position of the charging cooperation module to correspond to the position of the charging module, or allow positions of two charging cooperation modules to correspond to each other.

BRIEF DESCRIPTION OF THE DRAWINGS

The drawings herein are incorporated into the specification and constitute a part of the specification, show embodiments consistent with the present disclosure, and together with the specification are used to explain the principles of the present disclosure.

DETAILED DESCRIPTION

Detailed description of the exemplary embodiments will be made herein, with examples thereof to be shown in drawings. In the following descriptions, when the drawings are referred to, unless expressed otherwise, the same number in different drawings refers to the same or similar elements. The embodiments described in the exemplary embodiments as below do not represent all embodiments that are consistent with the present disclosure. On the contrary, they are only examples of the devices and the methods that are consistent with some of the aspects of the present disclosure as recited in the claims.

Wireless charging technology is widely used in mobile phones and other electronic products. In a wireless charging process, wireless charging transmitting coils of a charging transmitter and wireless charging receiving coils of a charging receiver cooperate to realize the wireless charging of mobile phones and other electronic products. In the related art, there are various types of electronic products using wireless charging technology such as charging docks and mobile phones, and wireless charging transmitters and wireless charging receivers usually have a one-to-one matching relationship. Charging modules between different types of charging transmitters and charging receivers cannot be aligned structurally, resulting in failure of the wireless charging process.

The present disclosure provides a charging device used in conjunction with an electronic device. The electronic device includes a charging cooperation module, and the charging device includes a charging module and a plurality of magnetically attractable components. One or more of the magnetically attractable components form a plurality of sets of positioning modules, and each set of positioning modules forms one positioning structure of a plurality of positioning structures. Each positioning structure can be positioned to cooperate with at least one type of electronic devices, so that a position of the charging module corresponds to a position of the charging cooperation module.

In the above embodiments, the charging device includes a plurality of magnetically attractable components, one or more of the magnetically attractable components form a plurality of sets of positioning modules, and each set of positioning modules forms one positioning structure of the plurality of positioning structures, so that the charging device includes a plurality of sets of positioning structures. In the process of using the charging device and the electronic device cooperatively to achieve charging, the charging device including a plurality of sets of positioning structures can be positioned to match with various types of electronic devices, thereby improving the compatibility of the charging device.

Figure 1:
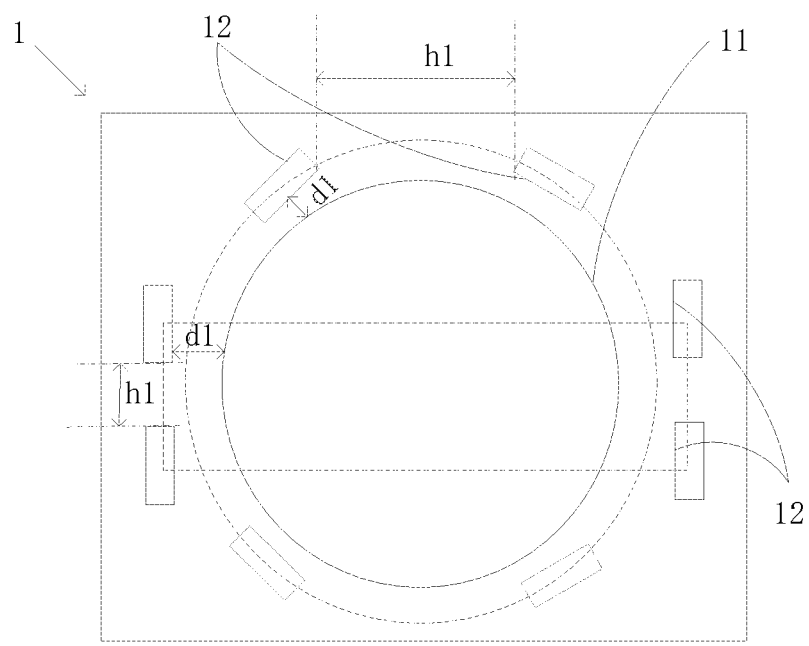
FIG. 1 is a first perspective view of a charging device in an exemplary embodiment of the present disclosure.

FIG. 1 is a schematic diagram of a charging device in an exemplary embodiment of the present disclosure. As shown in FIG. 1, the charging device 1 includes a charging module 11 and eight magnetically attractable components 12. Four magnetically attractable components 12 shown in solid lines constitute a first set of positioning modules with a rectangular positioning structure. Four magnetically attractable components 12 shown in dashed lines constitute a second set of positioning modules with a circular positioning structure. During the use of the charging device 1, one type of electronic device 2 is positioned to cooperate with the positioning structure of the first set of positioning modules of the charging device 1, and the position of the charging module 11 of the charging device 1 corresponds to the position of the charging cooperation module 21 of the electronic device 2. Another type of electronic device 2 is positioned to cooperate with the positioning structure of the second set of positioning modules of the charging device 1, and the charging module 11 of the charging device 1 corresponds to the position of the charging cooperation module 21 of the electronic device 2.

The charging device 1 includes the plurality of magnetically attractable components 12, and one or more of the magnetically attractable components 12 form the plurality of sets of positioning modules, and each set of positioning modules forms one positioning structure of a plurality of positioning structures, so that the charging device 1 includes a plurality of sets of positioning structures. In the process of using the charging device 1 and the electronic device 2 cooperatively to achieve charging, the charging device 1 including a plurality of sets of positioning structures can be positioned and match with various types of electronic devices 2, thereby improving the compatibility of the charging device 1.

The position correspondence between the charging module 11 of the charging device 1 and the charging cooperation module 21 of the electronic device 2 may refer to that the center of the charging module 11 of the charging device 1 coincides with the center of the charging cooperation module 21 of the electronic device 2, or the center of the charging module 11 of the charging device 1 is offset from the center of the charging cooperation module 21 of the electronic device 2 within a preset error range. When positioning cooperation modules of the electronic device 2 are positioned to align and cooperate with the positioning modules of the charging device 1, positions of magnetically attractable cooperation components 22 forming the positioning cooperation modules correspond to positions of the magnetically attractable components 12 forming the positioning modules. The position correspondence between the magnetically attractable cooperation component 22 and the magnetically attractable component 12 may mean that the center of the magnetically attractable cooperation component 22 coincides with the center of the magnetically attractable component 12, or the center of the magnetically attractable cooperation component 22 is offset from the magnetically attractable component 12 within a preset error range.

The above-mentioned charging module 11 may be a wireless transmitting coil arranged in the charging device 1, and the charging cooperation module 21 may be a wireless receiving coil arranged in the charging device 1. The wireless transmitting coil and the wireless receiving coil may be circular, rectangular or in other irregular shapes.

It should be noted that shapes of the positioning structures of the plurality of sets of positioning modules formed by the plurality of magnetically attractable components 12 may include at least one of a circle, an ellipse, a rectangle, and an irregular shape, which is not limited in the present disclosure. The shape of the positioning structure of the positioning modules formed by the magnetically attractable components 12 can be set according to the contour shape of the charging module 11, or can be set according to the number, preset positions and the like of the magnetically attractable components 12 that constitute this set of positioning modules, which is not limited in the present disclosure. For example, when the charging module 11 of the charging device 1 is a charging transmitting coil, the charging transmitting coil forms a circular contour structure, and the shape of the positioning structure of any one of the plurality of sets of positioning modules may be a circle arranged on a periphery of the circular contour structure of the charging transmitting coil, or may be a rectangle arranged on the periphery of the circular contour structure of the charging transmitting coil.

As shown in FIG. 1, the wireless transmitting coil is circular, and the charging device 1 includes eight magnetically attractable components 12 arranged along a periphery of the wireless transmitting coil. Four magnetically attractable components 12 shown in dashed lines constitute a first set of positioning modules, and the first set of positioning modules has a circular positioning structure. Four magnetically attractable components 12 shown in solid lines constitute a second set of positioning modules, and the second set of positioning modules has a rectangular positioning structure.

Alternatively, in other embodiments, the number of magnetically attractable components 12 can be adjusted according to an area of the wireless transmitting coil, to constitute more than two sets of positioning modules.

In some embodiments, as shown in FIG. 1, the magnetically attractable components 12 are arranged along a peripheral direction of the charging module 11, and a first preset distance d1 is provided between each magnetically attractable component 12 and the charging module 11. In one embodiment, the magnetically attractable components 12 are arranged in the peripheral direction of the charging module 11, so that the combination of one or more magnetically attractable components 12 can form different positioning modules, which improves the diversity and convenience of the positioning structures. In another embodiment, a first preset distance d1 is provided between each magnetically attractable component 12 and the charging module 11, and the first preset distance d1 between the magnetically attractable component 12 and the charging module 11 can reduce structural and functional interference between the magnetically attractable component 12 and the charging module 11.

In one embodiment, the magnetically attractable components 12 may be evenly distributed along the peripheral direction of the charging module 11 to reduce the design difficulty and manufacturing difficulty about the distribution of the plurality of magnetically attractable components 12, and increase the diversity of the combination of positioning modules. Additionally or alternatively, in another embodiment, the first preset distance d1 between each magnetically attractable component 12 and the charging module 11 is identical, which can reduce the design difficulty and manufacturing difficulty about the distribution of the plurality of magnetically attractable components 12, increase the diversity of the combination of positioning modules, and decrease the space of the charging device 1 occupied by the plurality of magnetically attractable components 12.

It should be noted that the first preset distance d1 may be the shortest distance between adjacent edges of the magnetically attractable component 12 and the charging module 11. In order to avoid the structural and functional interference between the magnetically attractable component 12 and the charging module 11 and reduce the space occupied by the magnetically attractable component 12, the first preset distance d1 may be greater than or equal to 0.01 mm and less than or equal to 10 mm. For example, when the charging module 11 has a circular structure and the magnetically attractable component 12 is a bar magnet, the first preset distance d1 can be the shortest distance from a straight edge of the magnetically attractable component 12 adjacent to a circular edge of the charging module 11 to the circular edge of the charging module 11. The straight edge of the bar magnet adjacent to the charging module 11 may be perpendicular to a radius extension line of the circular structure of the charging module 11, so that the overall arrangement of the bar magnets is aesthetic and a plurality of sets of positioning modules can be formed conveniently. Alternatively, the straight edge of the bar magnet may also be at a preset angle to a corresponding radius of the circular structure of the charging module 11. The magnetically attractable component 12 of other structure types may also adopt other spatial postures relative to the charging module 11, which is not limited in the present disclosure.

In other embodiments, a second preset distance h1 is provided between adjacent magnetically attractable components 12. The second preset distance h1 between adjacent magnetically attractable components 12 can structurally separate the adjacent magnetically attractable components 12, and the magnetically attractable components can thus be recombined to form different positioning modules. A plurality of sets of positioning modules are positioned to cooperate with different types of electronic devices 2 to improve the compatibility of the charging device 1.

It should be noted that the second preset distance h1 may refer to the shortest distance between adjacent edges of adjacent magnetically attractable components 12, and the second preset distance h1 between any pair of adjacent magnetically attractable components 12 may be the same or different, which is not limited in the present disclosure. In order to avoid structural interference and functional interference between the magnetically attractable components 12 and reduce the space occupied by the magnetically attractable components 12, the second preset distance h1 may be greater than or equal to 0.01 mm and less than or equal to 5 mm.

The charging device 1 may be a charging dock, a power bank or the like, and the electronic device 2 may be a mobile phone, a wearable device, a tablet computer, a vehicle terminal, a medical terminal, and other electrical devices. The types of the charging device 1 and the electronic device 2 are not limited in the present disclosure. When the charging device 1 is a charging dock, the electronic device 2 can be any type of electric devices. Hereinafter, the structural arrangement of the charging device 1 and the cooperation relationship between the charging device 1 and the electronic device 2 will be exemplified by taking the charging device 1 as a charging dock and the electronic device 2 as a mobile phone.

Figure 2:
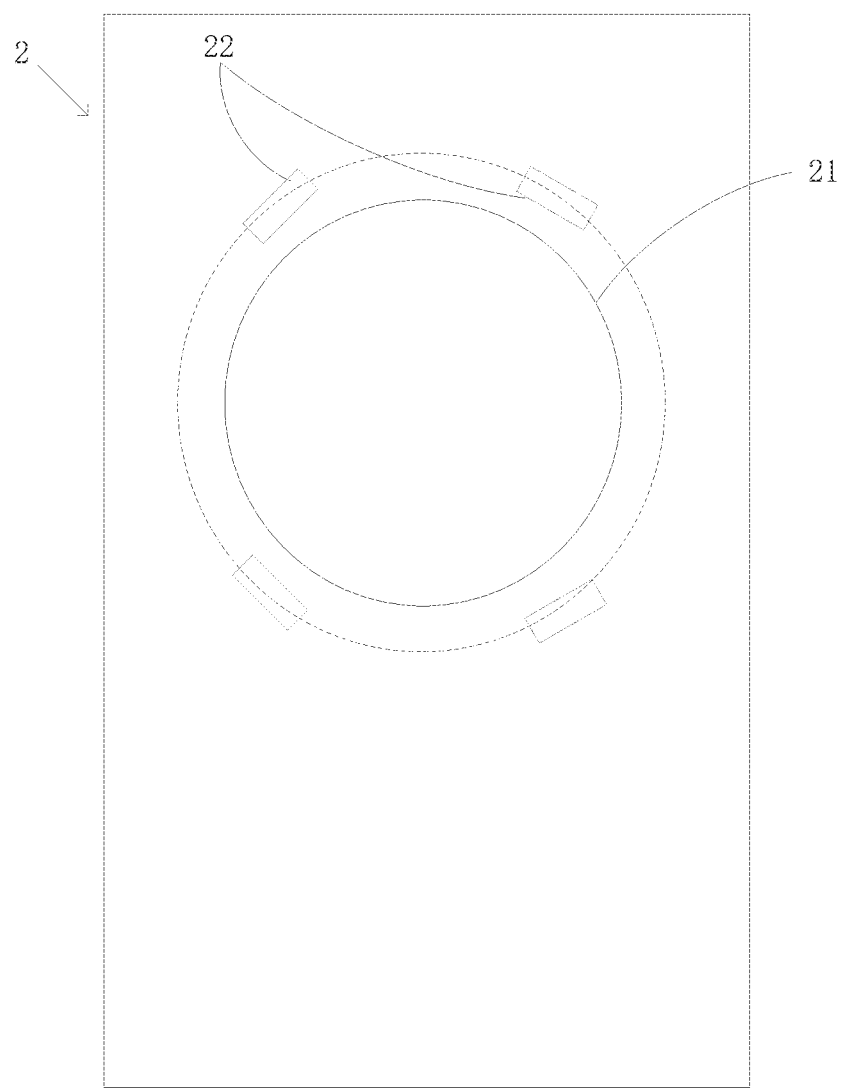
FIG. 2 is a perspective view of an electronic device in an exemplary embodiment of the present disclosure.
Figure 3:
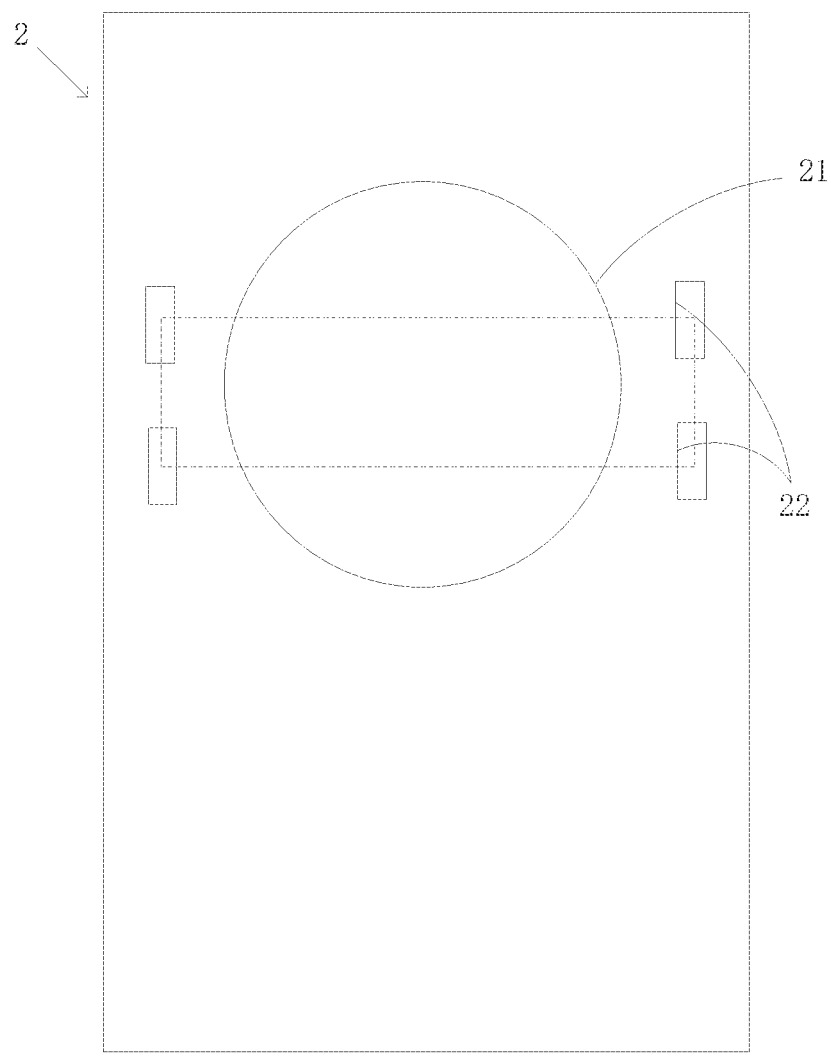
FIG. 3 is a perspective view of an electronic device in another exemplary embodiment of the present disclosure.

When the charging device 1 is a charging dock and the electronic device 2 is a mobile phone, at least two types of mobile phones can be charged by using the charging dock. As shown in FIG. 2, when one of the adaptable types of mobile phones cooperates with the charging dock, a magnetically attractable cooperation component 22 of the mobile phone is positioned to cooperate with a circular positioning structure of a first set of positioning modules of the charging dock, and a wireless transmitting coil of the charging dock corresponds to a position of a wireless receiving coil of this type of mobile phones. As shown in FIG. 3, when another adaptable type of mobile phones cooperates with the charging dock, the magnetically attractable cooperation component 22 of the mobile phone is positioned to cooperate with a rectangular positioning structure of a second set of positioning modules of the charging dock, and a wireless transmitting coil of the charging dock corresponds to a position of a wireless receiving coil of this type of mobile phones.

Figure 4:
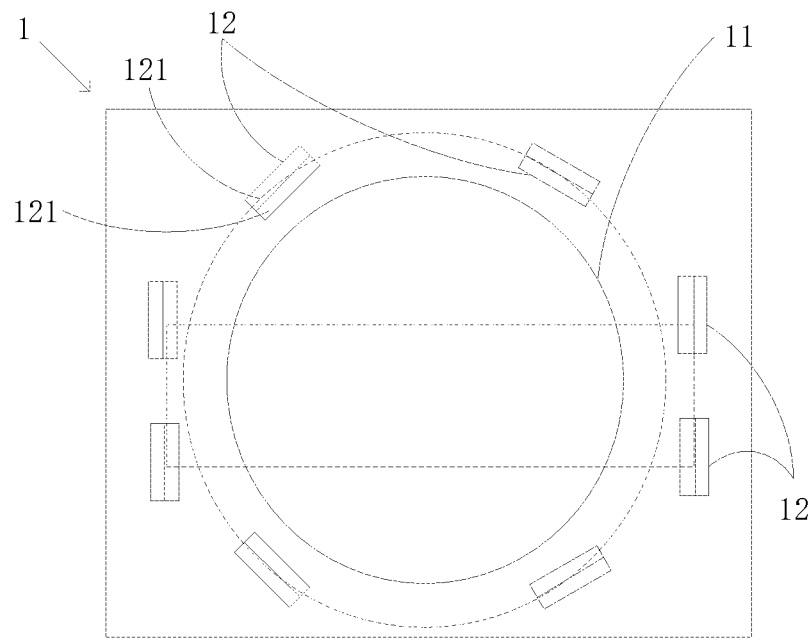
FIG. 4 is a second perspective view of a charging device in an exemplary embodiment of the present disclosure.
Figure 5:
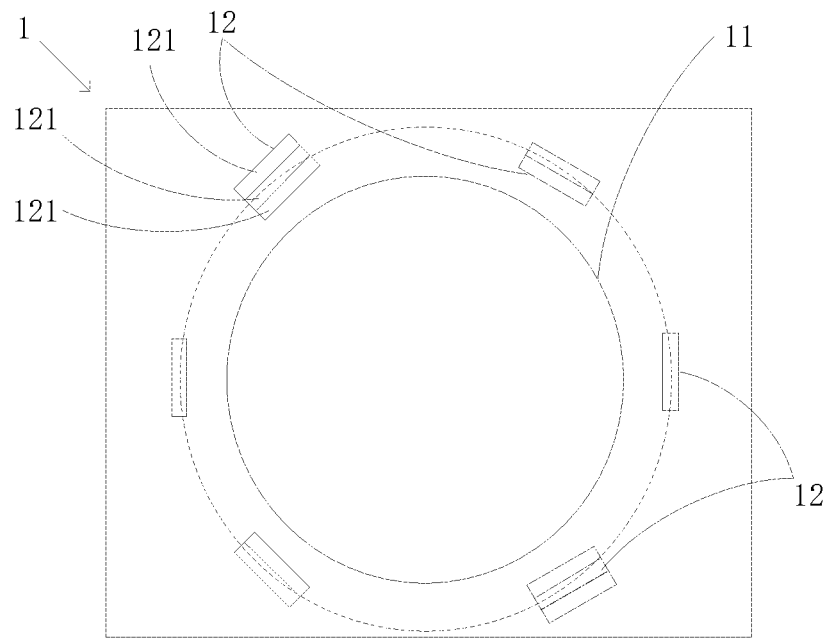
FIG. 5 is a third perspective view of a charging device in an exemplary embodiment of the present disclosure.

In some embodiments, each of the plurality of magnetically attractable components 12 includes at least one magnetic element 121; the number of the magnetic elements 121 of each of the plurality of magnetically attractable components 12 has the same number of magnetic elements, or at least two of the plurality of magnetically attractable components 12 have different numbers of magnetic elements. For example, as shown in FIG. 4, each of the plurality of magnetically attractable components 12 includes two magnetic elements 121 arranged in a stacked manner, and four magnetically attractable components 12 are arranged along a peripheral direction of the charging module 11, forming a circular positioning structure shown by dashed lines. Four magnetically attractable components 12 are arranged on a periphery of the charging module 11 to form a rectangular positioning structure shown by dashed lines. For example, as shown in FIG. 5, the charging device 1 includes six magnetically attractable components 12; two magnetically attractable components 12 each include one magnetic element 121, two magnetically attractable components 12 each include two magnetic elements 121, and two magnetically attractable components 12 each include three magnetic elements 121. A plurality of magnetically attractable components 12 are evenly arranged along the peripheral direction of the charging module 11 to form a circular positioning structure shown by dashed lines, and the plurality of magnetically attractable components 12 have a centrosymmetric distribution relationship with respect to the charging cooperation module 21.

In some embodiments, each magnetically attractable component 12 includes a plurality of magnetic elements 121 that cooperate with each other, and a magnetic field of the magnetically attractable component 12 is divided by the cooperation of the plurality of magnetic elements 121, thereby reducing the functional interference between the magnetically attractable component 12 and the charging module 11 and lowering the overall power loss of the charging device 1.

Figure 6:
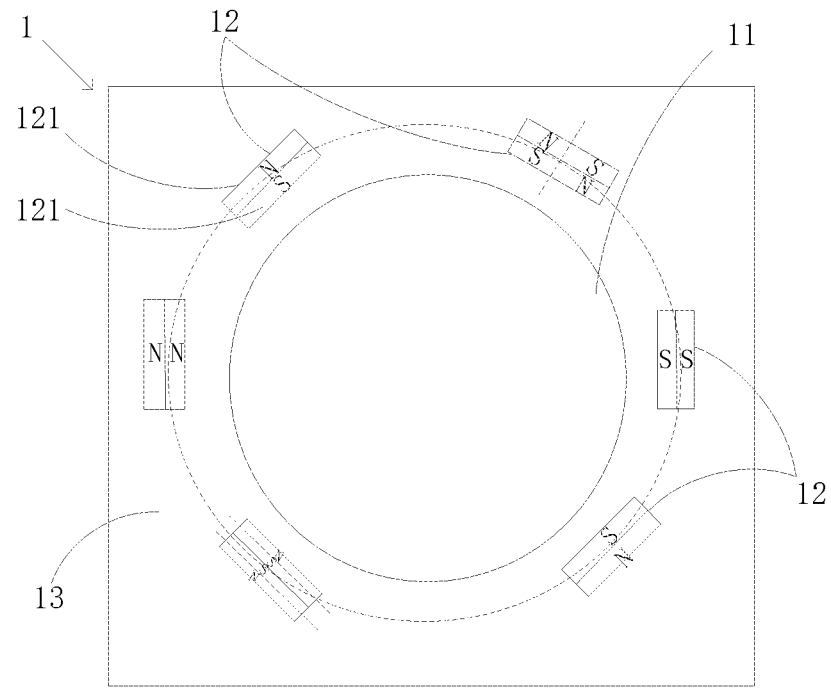
FIG. 6 is a fourth perspective view of a charging device in an exemplary embodiment of the present disclosure.

In the above embodiments, each magnetic element 121 may be a bar magnet, and the magnetic elements 121 of the same magnetically attractable component 12 have the same or opposite internal magnetic field direction. For example, as shown in FIG. 6, the charging module 11 may include a first charging cooperation surface 13 positioned to cooperate with the electronic device 2, and the plurality of magnetic elements 121 of the same magnetically attractable component 12 may be arranged side by side in a direction parallel to the first charging cooperation surface 13. In an example where each magnetically attractable component 12 includes two magnetic elements 121, similarly, magnetic poles of the two magnetic elements 121 facing the first charging cooperation surface 13 can be the same N-pole or the same S-pole; it is also possible that a magnetic pole of one of the two magnetic elements 121 facing the first charging cooperation surface 13 is an N-pole, while a magnetic pole of the other of the two magnetic elements 121 facing the first charging cooperation surface 13 is an S-pole; it is also possible that each magnetic element 121 contains an N-pole and an S-pole, and the N-pole and the S-pole can be arranged in a left-right direction or up-down direction.

Figure 7:
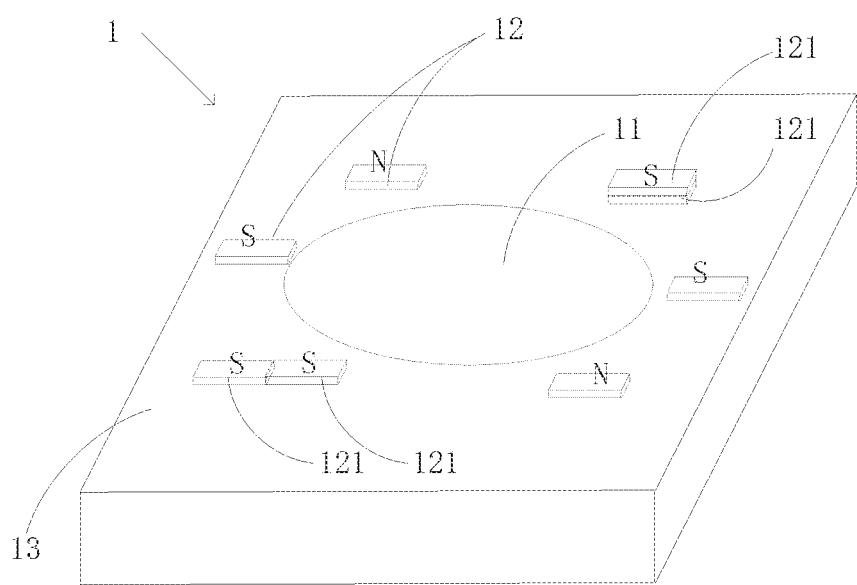
FIG. 7 is a three-dimensional diagram of a charging device in an exemplary embodiment of the present disclosure.

For example, as shown in FIG. 7, the charging module 11 may include a first charging cooperation surface 13 positioned to cooperate with the electronic device 2. The plurality of magnetic elements 121 of the same magnetically attractable component 12 may be arranged in a stacked manner along a direction perpendicular to the first charging cooperation surface 13, or the plurality of magnetic elements 121 of the same magnetically attractable component 12 may be arranged side by side along a direction parallel to the first charging cooperation surface 13. In an example where each magnetically attractable component 12 includes two magnetic elements 121, magnetic poles of the two magnetic elements 121 facing the first charging cooperation surface 13 can be the same N-pole or the same S-pole; it is also possible that a magnetic pole of one of the two magnetic elements 121 facing the first charging cooperation surface 13 is an N-pole, while a magnetic pole of the other of the two magnetic elements 121 facing the first charging cooperation surface 13 is an S-pole; it is also possible that each magnetic element 121 contains an N-pole and an S-pole, and the N-pole and the S-pole can be arranged in a left-right direction or up-down direction.

Alternatively, the magnetic element 121 may also be a columnar magnet or an irregularly-shaped magnet, and the present disclosure does not limit the structural shape and spatial arrangement posture of the magnetic elements.

The present disclosure further proposes an electronic device that is used in conjunction with a charging device or another electronic device. The charging device includes a charging module, and the electronic device includes a charging cooperation module and a plurality of magnetically attractable cooperation components. One or more of the magnetically attractable cooperation components form a plurality of sets of positioning cooperation modules, and each set of positioning cooperation modules forms one positioning cooperation structure of a plurality of positioning cooperation structures. Each positioning cooperation structure can be positioned to cooperate with at least one type of charging devices or at least one type of electronic devices, so that the position of the charging cooperation module corresponds to the position of the charging module, or positions of two charging cooperation modules correspond to each other.

The electronic device includes a plurality of magnetically attractable cooperation components, one or more of the magnetically attractable cooperation components form a plurality of sets of positioning cooperation modules, and each set of positioning cooperation modules forms one positioning cooperation structure of the plurality of positioning cooperation structures, so that the electronic device includes a plurality of sets of positioning cooperation structures. During the cooperative use of electronic devices or of the charging device and the electronic device to achieve charging, the electronic device including a plurality of sets of positioning cooperation structures can be positioned to match with various types of electronic devices or charging devices, thus improving the compatibility of the electronic device.

Figure 8:
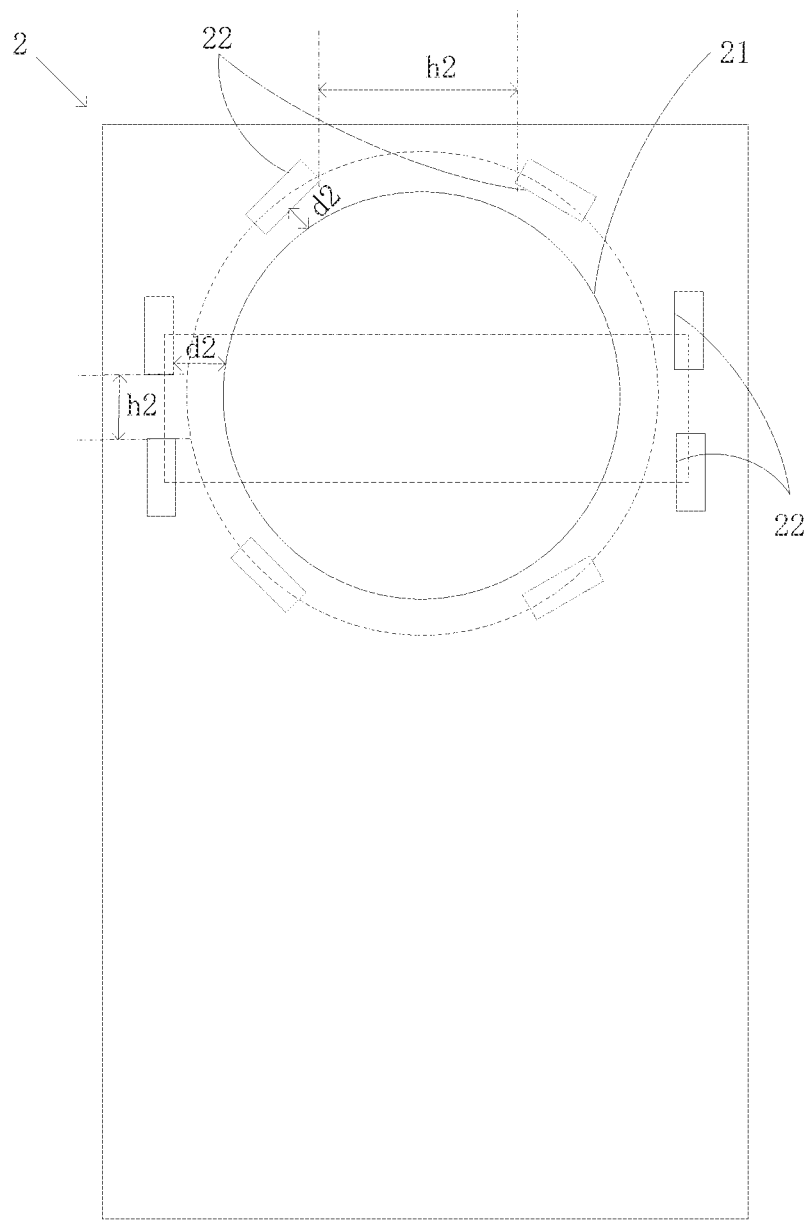
FIG. 8 is a first perspective view of an electronic device in an exemplary embodiment of the present disclosure.

FIG. 8 is a schematic diagram of an electronic device in an exemplary embodiment of the present disclosure. As shown in FIG. 8, the electronic device 2 includes a charging cooperation module 21 and eight magnetically attractable cooperation components 22. Four magnetically attractable cooperation components 22 shown in solid lines constitute a first set of positioning cooperation modules with a rectangular positioning cooperation structure. Four magnetically attractable cooperation components 22 shown in dashed lines constitute a second set of positioning cooperation modules with a circular positioning cooperation structure. During the wireless charging of the electronic device 1, one type of electronic device 2 or charging device 1 can be positioned to cooperate with the positioning cooperation structure of the first set of positioning cooperation modules of the electronic device 2, and positions of the charging cooperation modules 21 correspond to each other, or positions of the charging cooperation module 21 and the charging module 11 correspond to each other. Another type of electronic device 2 or charging device can be positioned to cooperate with the positioning cooperation structure of the second set of positioning cooperation modules of the electronic device 2, and the positions of the charging cooperation modules 21 correspond to each other, or positions of the charging module 11 and the charging cooperation module 21 correspond to each other.

The charging cooperation module 21 may be a wireless receiving coil arranged in the charging device 1, and the charging module 11 may be a wireless transmitting coil arranged in the charging device 1. The wireless transmitting coil and the wireless receiving coil may be circular, rectangular or in other irregular shapes.

It should be noted that shapes of the positioning cooperation structures of the plurality of sets of positioning cooperation modules formed by the plurality of magnetically attractable cooperation components 22 may include at least one of a circle, an ellipse, a rectangle, and an irregular shape, which is not limited in the present disclosure. The shape of the positioning cooperation structure of the positioning cooperation modules formed by the magnetically attractable cooperation components 22 can be set according to the contour shape of the charging cooperation module 21, or can be set according to the number, preset positions and the like of the magnetically attractable cooperation components 22 that constitute this set of positioning cooperation modules, which is not limited in the present disclosure.

For example, when the charging cooperation module 21 of the electronic device 2 is a charging receiving coil, the charging receiving coil forms a circular contour structure, and the shape of the positioning cooperation structure of any one of the plurality of sets of positioning cooperation modules may be a circle arranged on a periphery of the circular contour structure of the charging receiving coil, or may be a rectangle arranged on the periphery of the circular contour structure of the charging receiving coil.

As shown in FIG. 8, the wireless receiving coil is circular, and the electronic device 2 includes eight magnetically attractable cooperation components 22 arranged along a periphery of the wireless receiving coil. Four magnetically attractable cooperation components 22 shown in dashed lines constitute a first set of positioning cooperation modules, and the first set of positioning cooperation modules has a circular positioning cooperation structure. Four magnetically attractable cooperation components 22 shown in solid lines constitute a second set of positioning cooperation modules, and the second set of positioning cooperation modules has a rectangular positioning cooperation structure.

Alternatively, in other embodiments, the number of magnetically attractable cooperation components 22 can be adjusted according to an area of the wireless receiving coil, to constitute more than two sets of positioning cooperation modules.

In some embodiments, as shown in FIG. 8, the magnetically attractable cooperation components 22 are arranged along a peripheral direction of the charging cooperation module 21, and a third preset distance d2 is provided between each magnetically attractable cooperation component 22 and the charging cooperation module 21. In one embodiment, the magnetically attractable cooperation components 22 are arranged in the peripheral direction of the charging cooperation module 21, so that the combination of one or more magnetically attractable cooperation components 22 can form different positioning cooperation modules, which improves the diversity and convenience of the positioning cooperation structures. In another embodiment, a third preset distance d2 is provided between each magnetically attractable cooperation component 22 and the charging cooperation module 21, and the third preset distance d2 between the magnetically attractable cooperation component 22 and the charging cooperation module 21 can reduce structural and functional interference between the magnetically attractable cooperation component 22 and the charging cooperation module 21.

In one embodiment, the magnetically attractable cooperation components 22 can be evenly distributed along the peripheral direction of the charging cooperation module 21, to reduce the design difficulty and manufacturing difficulty about the distribution of the plurality of magnetically attractable cooperation components 22, and increase the diversity of the combination of positioning cooperation modules. Additionally or alternatively, in another embodiment, the third preset distance d2 between each magnetically attractable cooperation component 22 and the charging cooperation module 21 is identical, which can reduce the design difficulty and manufacturing difficulty about the distribution of the plurality of magnetically attractable cooperation components 22, increase the diversity of the combination of positioning cooperation modules, and decrease the space of the electronic device 2 occupied by the plurality of magnetically attractable cooperation components 22.

It should be noted that the third preset distance d2 may be the shortest distance between adjacent edges of the magnetically attractable cooperation component 22 and the charging cooperation module 21. In order to avoid the structural and functional interference between the magnetically attractable cooperation component 22 and the charging cooperation module 21 and reduce the space occupied by the magnetically attractable cooperation component 22, the third preset distance d2 can be greater than or equal to 0.01 mm and less than or equal to 10 mm. For example, when the charging cooperation module 21 has a circular structure and the magnetically attractable cooperation component 22 is a bar magnet, the third preset distance d2 can be the shortest distance from a straight edge of the magnetically attractable cooperation component 22 adjacent to a circular edge of the charging cooperation module 21 to the charging cooperation module 21. The straight edge of the bar magnet adjacent to the charging cooperation module 21 may be perpendicular to a radius extension line of the circular structure of the charging cooperation module 21, so that the overall arrangement of the bar magnets is aesthetic and a plurality of sets of positioning cooperation modules can be formed conveniently. Alternatively, the straight edge of the bar magnet can also be at a preset angle to a corresponding radius of the circular structure of the charging cooperation module 21. The magnetically attractable cooperation component 22 of other structure types can also adopt other spatial postures relative to the charging cooperation module 21, which is not limited in the present disclosure.

In other embodiments, a fourth preset distance h2 is provided between adjacent magnetically attractable cooperation components 22. The fourth preset distance h2 between adjacent magnetically attractable cooperation components 22 can structurally separate the adjacent magnetically attractable cooperation components 22, and the magnetically attractable cooperation components can thus be recombined to form different positioning cooperation modules. A plurality of sets of positioning cooperation modules are positioned to cooperate with different types of electronic devices 2 to improve the compatibility of the electronic device 2.

It should be noted that the fourth preset distance h2 may refer to the shortest distance between adjacent edges of adjacent magnetically attractable cooperation components 22, and the fourth preset distance h2 between any pair of adjacent magnetically attractable cooperation components 22 may be the same or different, which is not limited in the present disclosure. In order to avoid structural interference and functional interference between the magnetically attractable cooperation components 22 and reduce the space occupied by the magnetically attractable cooperation components 22, the fourth preset distance h2 can be greater than or equal to 0.01 mm and less than or equal to 5 mm.

The electronic device 2 may be a mobile phone, a wearable device, a tablet computer, a vehicle terminal, a medical terminal, and other electrical devices, and the charging device 1 may be a charging dock, a power bank or the like. The types of the charging device 1 and the electronic device 2 are not limited in the present disclosure.

Figure 9:
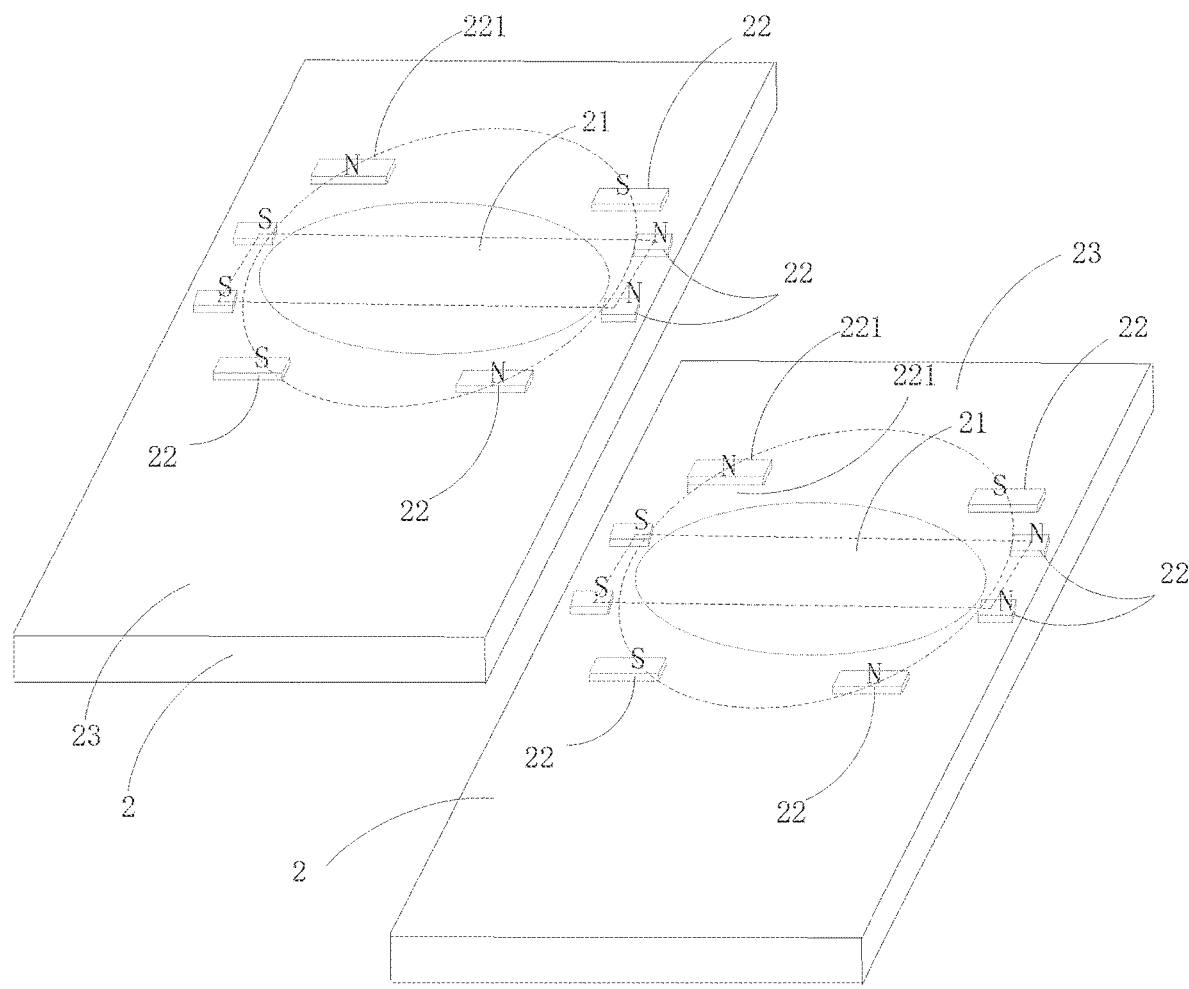
FIG. 9 is an exploded three-dimensional diagram of an electronic device in conjunction with another electronic device in an exemplary embodiment of the present disclosure.

In an example where the electronic device 2 is a mobile phone, the charging cooperation relationship between two electronic devices 2 will be elaborated. As shown in FIG. 9, two mobile phones can be positioned to be aligned and cooperate with each other by a pair of positioning cooperation modules, and charging between the two mobile phones can be realized by correspondence and cooperation of positions of a pair of charging cooperation modules 21.

Figure 10:
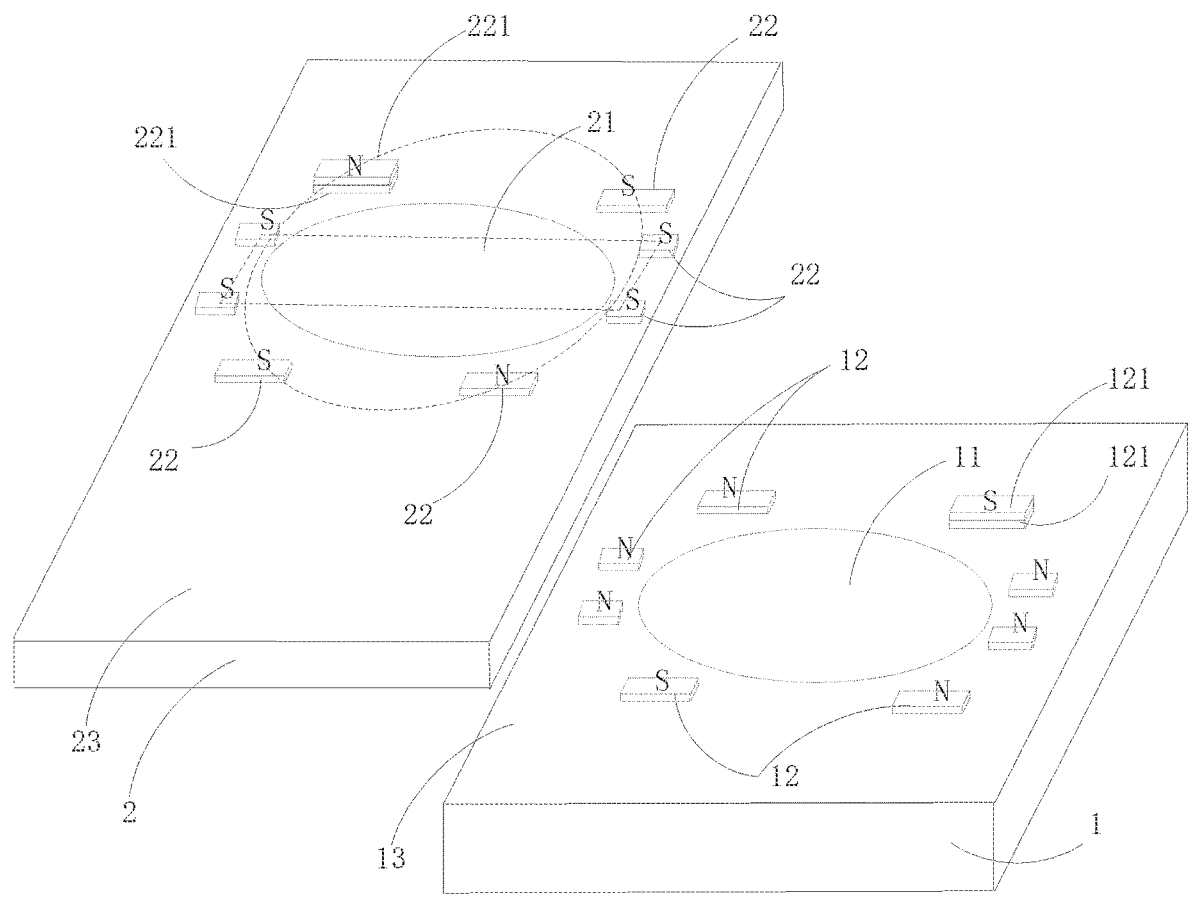
FIG. 10 is an exploded three-dimensional diagram of an electronic device in conjunction with a charging device in an exemplary embodiment of the present disclosure.

In an example where the electronic device 2 is a mobile phone, the charging cooperation relationship between the electronic device 2 and the charging device 1 will be elaborated. As shown in FIG. 10, the charging dock and the mobile phone can be positioned to be aligned and cooperate with each other through the positioning module and the positioning cooperation module, and charging can be achieved by correspondence and cooperation of positions of the charging module 11 and the charging cooperation module 21.

The positional correspondence between the two charging cooperation modules 21 described above may mean that centers of the charging cooperation modules 21 of the electronic devices 2 coincide with each other, or the centers of the charging cooperation modules 21 of the electronic devices 2 are offset from each other within a preset error range. When the positioning cooperation modules of the two electronic devices 2 are positioned to be aligned and cooperate with each other, the positions of the magnetically attractable cooperation components 22 that constitute the positioning cooperation modules correspond to each other. The position correspondence of the magnetically attractable cooperation components 22 may refer to that centers of the magnetically attractable cooperation components 22 coincide with each other or are offset from each other within a preset error range.

The position correspondence between the charging module 11 of the charging device 1 and the charging cooperation module 21 of the electronic device 2 may refer to that the center of the charging module 11 of the charging device 1 coincides with the center of the charging cooperation module 21 of the electronic device 2, or the center of the charging module 11 of the charging device 1 is offset from the center of the charging cooperation module 21 of the electronic device 2 within a preset error range. When positioning cooperation modules of the electronic device 2 are positioned to align and cooperate with the positioning modules of the charging device 1, positions of magnetically attractable cooperation components 22 forming the positioning cooperation modules correspond to positions of the magnetically attractable components 12 forming the positioning modules. The position correspondence between the magnetically attractable cooperation component 22 and the magnetically attractable component 12 may mean that the center of the magnetically attractable cooperation component 22 coincides with the center of the magnetically attractable component 12, or the center of the magnetically attractable cooperation component 22 is offset from the magnetically attractable component 12 within a preset error range.

Figure 11:
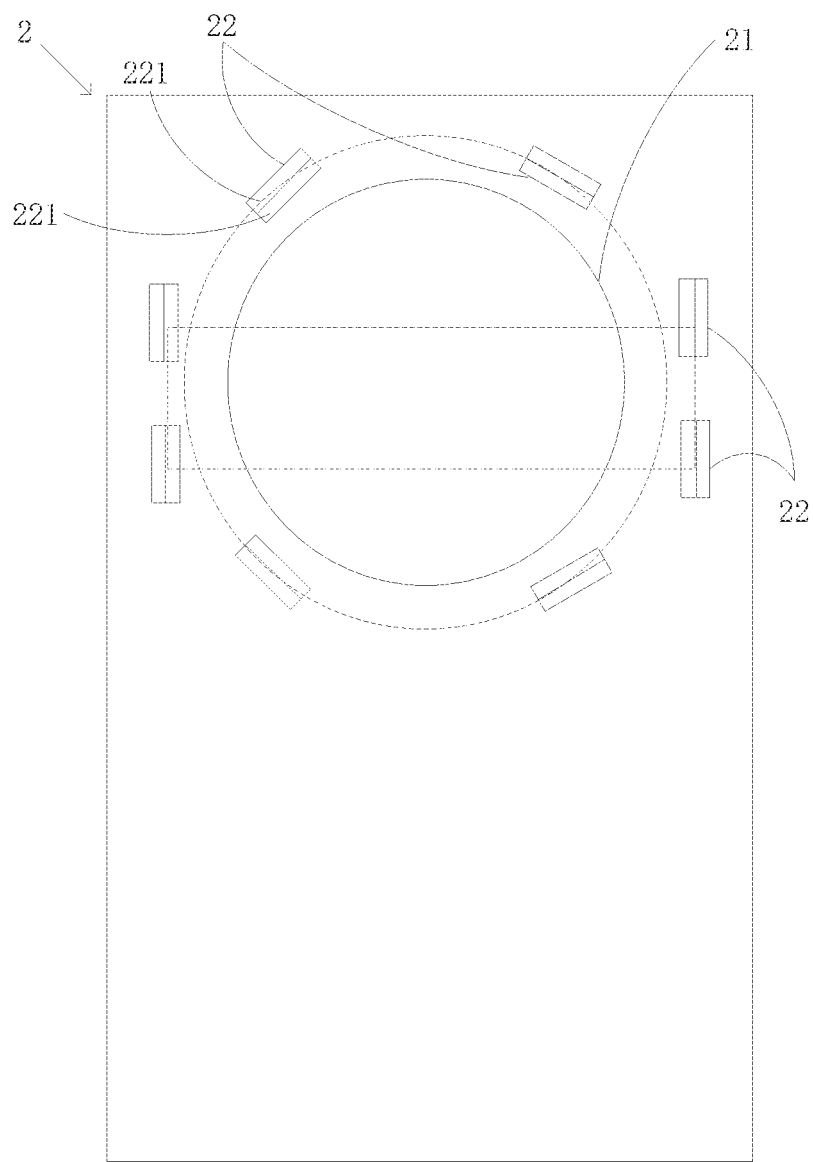
FIG. 11 is a second perspective view of an electronic device in an exemplary embodiment of the present disclosure.
Figure 12:
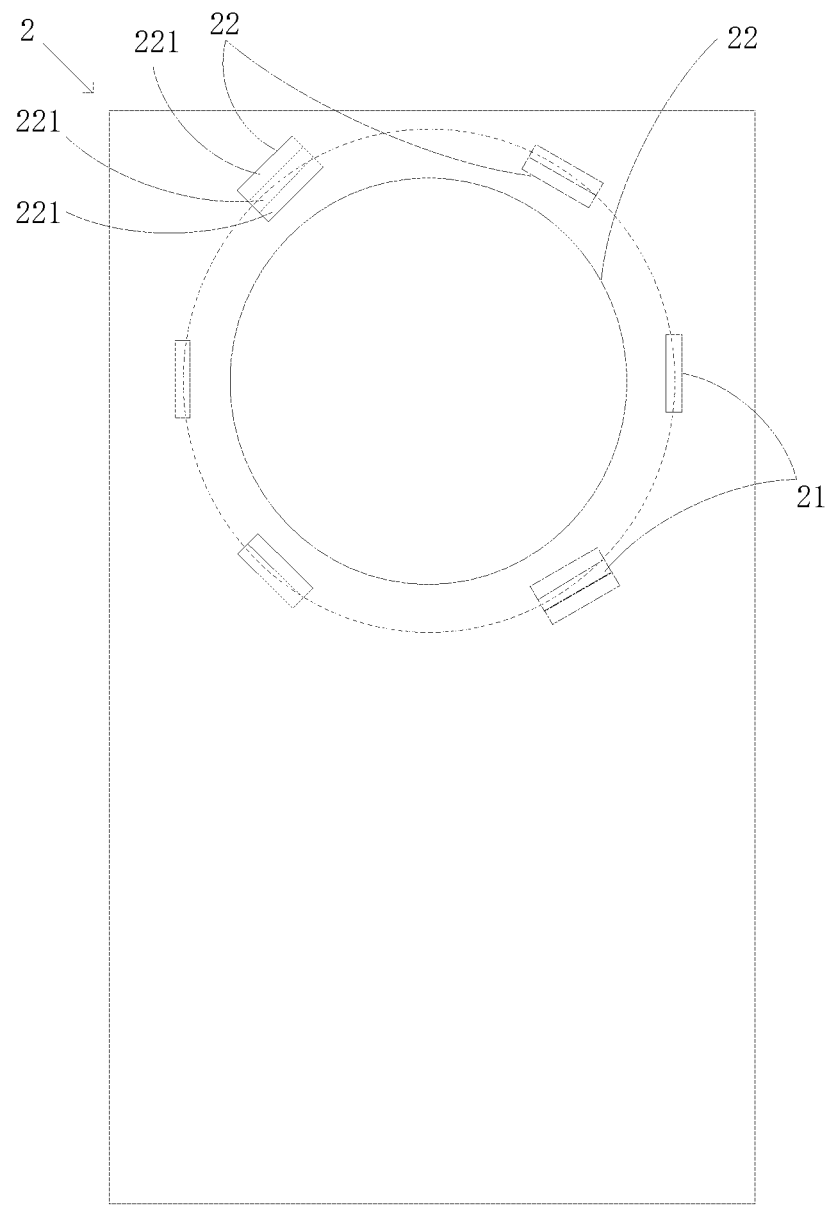
FIG. 12 is a third perspective view of an electronic device in an exemplary embodiment of the present disclosure.

In some embodiments, the magnetically attractable cooperation component 22 includes at least one magnetic cooperation element 221; each magnetically attractable cooperation component 22 has the same number of magnetic cooperation elements 221, or at least two magnetically attractable cooperation components 22 have different numbers of magnetic cooperation elements 221. For example, as shown in FIG. 11, each magnetically attractable cooperation component 22 includes two magnetic cooperation elements 221 arranged in a stacked manner; four magnetically attractable cooperation components 22 are arranged on a periphery of the charging cooperation module 21 and form a circular positioning cooperation structure; four magnetically attractable cooperation components 22 are arranged on the periphery of the charging cooperation module 21 and form a rectangular positioning cooperation structure. For example, as shown in FIG. 12, the electronic device 2 includes six magnetically attractable cooperation components 22; two magnetically attractable cooperation components 22 each include one magnetic cooperation element 221, two magnetically attractable cooperation components 22 each include two magnetic cooperation elements 221, and two magnetically attractable cooperation components 22 each include three magnetic cooperation elements 221. A plurality of magnetically attractable cooperation components 22 are evenly arranged along the peripheral direction of the charging cooperation module 21 to form a circular positioning cooperation structure shown by dashed lines, and the magnetically attractable cooperation components 22 have a centrosymmetric distribution relationship with respect to the charging cooperation module 21.

In some embodiments, each magnetically attractable cooperation component 22 includes a plurality of magnetic cooperation elements 221 that cooperate with each other, and a magnetic field of the magnetically attractable cooperation component 22 is divided by the cooperation of the plurality of magnetic cooperation elements 221, thereby reducing the functional interference between the magnetically attractable cooperation component 22 and the charging cooperation module 21 and lowering the overall power loss of the electronic device 2.

Figure 13:
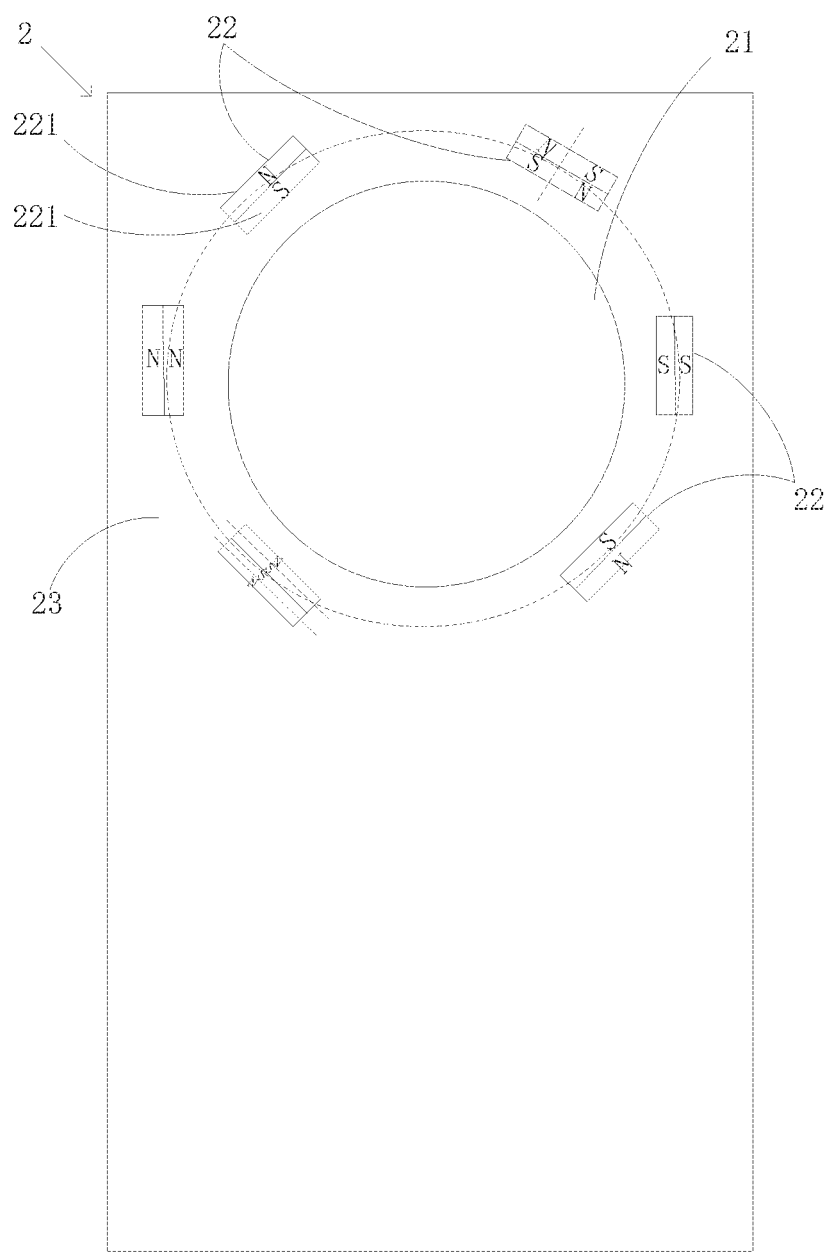
FIG. 13 is a fourth perspective view of an electronic device in an exemplary embodiment of the present disclosure.

In the above embodiments, each magnetic cooperation element 221 may be a bar magnet, and the magnetic cooperation elements 221 of the magnetically attractable cooperation component 22 have the same or opposite internal magnetic field direction. For example, as shown in FIG. 13, the charging cooperation module 21 may include a second charging cooperation surface 23 positioned to cooperate with the electronic device 2, and the plurality of magnetic cooperation elements 221 of the same magnetically attractable cooperation component 22 may be arranged side by side in a direction parallel to the second charging cooperation surface 23. In an example where each magnetically attractable cooperation component 22 includes two magnetic cooperation elements 221, similarly, magnetic poles of the two magnetic cooperation elements 221 facing the second charging cooperation surface 23 can be the same N-pole or the same S-pole; it is also possible that a magnetic pole of one of the two magnetic cooperation elements 221 facing the second charging cooperation surface 23 is an N-pole, while a magnetic pole of the other of the two magnetic cooperation elements 221 facing the second charging cooperation surface 23 is an S-pole; it is also possible that each magnetic cooperation element 221 contains an N-pole and an S-pole, and the N-pole and the S-pole can be arranged in a left-right direction or up-down direction.

Figure 14:
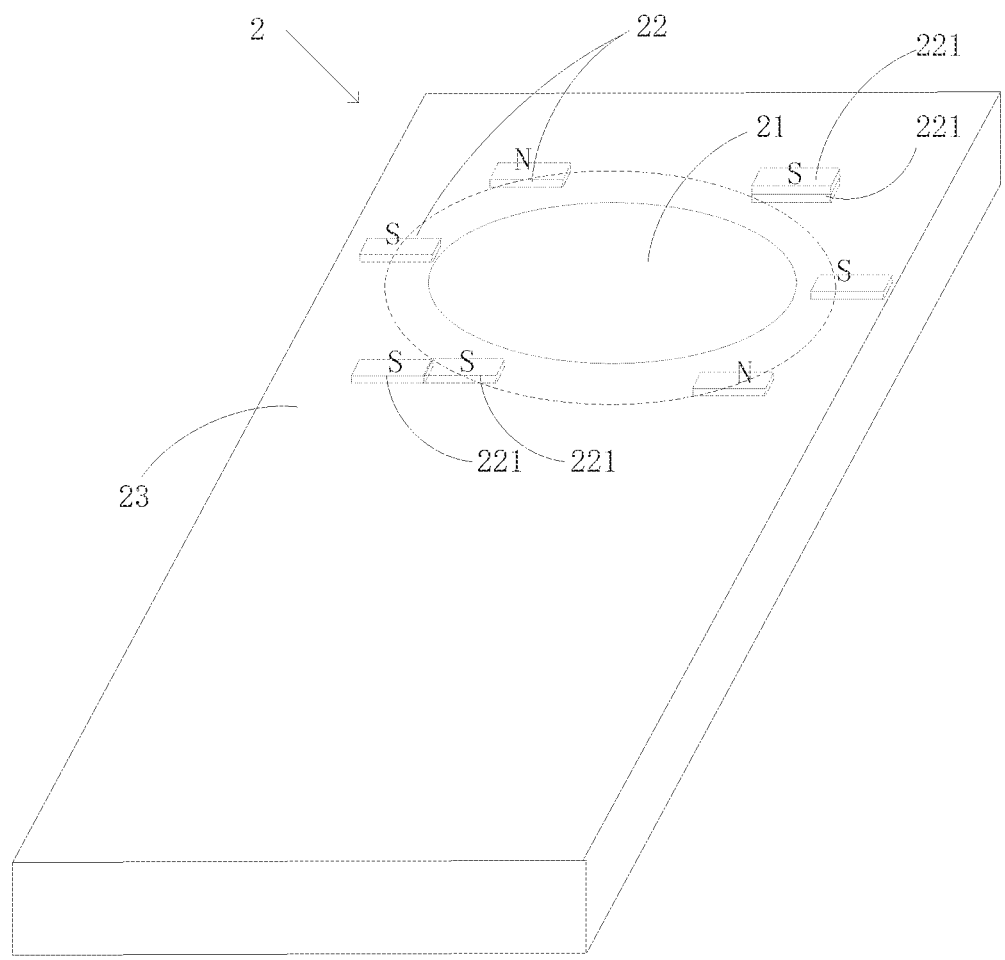
FIG. 14 is a three-dimensional diagram of an electronic device in an exemplary embodiment of the present disclosure.

For example, as shown in FIG. 14, the charging cooperation module 21 may include a second charging cooperation surface 23 positioned to cooperate with the electronic device 2, and the plurality of magnetic cooperation elements 221 of the same magnetically attractable cooperation component 22 may be arranged in a stacked manner along a direction perpendicular to the second charging cooperation surface 23. In an example where each magnetically attractable cooperation component 22 includes two magnetic cooperation elements 221, magnetic poles of the two magnetic cooperation elements 221 facing the second charging cooperation surface 23 can be the same N-pole or the same S-pole; it is also possible that a magnetic pole of one of the two magnetic cooperation elements 221 facing the second charging cooperation surface 23 is an N-pole, while a magnetic pole of the other of the two magnetic cooperation elements 221 facing the second charging cooperation surface 23 is an S-pole; it is also possible that each magnetic cooperation element 221 contains an N-pole and an S-pole, and the N-pole and the S-pole can be arranged in a left-right direction or up-down direction.

Alternatively, the magnetic cooperation element 221 may also be a columnar magnet or an irregularly-shaped magnet, and the present disclosure does not limit the structural shape and spatial arrangement posture of the magnetic cooperation elements.

The present disclosure further proposes a charging system that includes the charging device and/or the electronic device.

It should be noted that the charging device 1 may be a charging dock, a power bank or the like, and the electronic device 2 may be a mobile phone, a wearable device, a tablet computer, a vehicle terminal, a medical terminal, and other electrical devices.

In the above embodiments, the charging device 1 includes a plurality of magnetically attractable components 12. One or more of the magnetically attractable components 12 form a plurality of sets of positioning modules, and each set of positioning modules forms a positioning structure, so that the charging device 1 includes a plurality of sets of positioning modules. In the process of using the charging device 1 and the electronic device 2 cooperatively to achieve charging, the charging device 1 including a plurality of sets of positioning structures can be positioned to cooperate with various types of electronic devices 2, thereby improving the compatibility of the charging device 1.

The electronic device includes a plurality of magnetically attractable cooperation components. One or more of the magnetically attractable cooperation components form a plurality of sets of positioning cooperation modules, and each set of positioning cooperation modules forms one positioning cooperation structure of a plurality of positioning cooperation structures, so that the electronic device includes a plurality of sets of positioning cooperation structures. During the cooperative use of electronic devices or of the charging device and the electronic device to achieve charging, the electronic device including a plurality of sets of positioning cooperation structures can be positioned to match with various types of electronic devices or charging devices, thus improving the compatibility of the electronic device.

Other embodiments of the present disclosure may be conceivable for those skilled in the art after considering the specification and practicing the technical solutions disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are regarded as exemplary only, and the true scope of the present disclosure are indicated by the following claims.

It should be understood that the present disclosure is not limited to the particular structures described above and shown in the drawings, and various modifications and changes can be made without departing from the scope of the present disclosure. The scope of the present disclosure is only limited by the appended claims.

What is claimed is:

1. A charging device for use in conjunction with an electronic device, the electronic device comprising a charging cooperation module, and the charging device comprising a charging module and a plurality of magnetically attractable components, wherein one or more of the plurality of magnetically attractable components form a plurality of sets of positioning modules, and each set of positioning modules forms one positioning structure of a plurality of positioning structures; each positioning structure can be positioned to cooperate with at least one type of electronic devices, to allow a position of the charging module to correspond to a position of the charging cooperation module;

wherein the plurality of magnetically attractable components are arranged along a peripheral direction of the charging module and spaced apart from each other;

wherein each of the plurality of magnetically attractable components comprises a plurality of magnetic elements in contact with each other, and the plurality of magnetic elements of the same magnetically attractable component have the same or opposite internal magnetic field direction.

2. The charging device according to claim 1, wherein shapes of the positioning structures of the plurality of sets of positioning modules comprise at least one of a circle, an ellipse, a rectangle, and an irregular shape.

3. The charging device according to claim 1, wherein a first preset distance is provided between each magnetically attractable component and the charging module.

4. The charging device according to claim 3, comprising at least one of:

the plurality of magnetically attractable components being evenly distributed along the peripheral direction of the charging module; and the first preset distance between each of the plurality of magnetically attractable components and the charging module being identical.

5. The charging device according to claim 4, wherein a second preset distance is provided between adjacent ones of the plurality of magnetically attractable components.

6. The charging device according to claim 1, wherein each of the plurality of magnetically attractable components comprises at least one magnetic element; wherein one of:
- each of the plurality of magnetically attractable components has the same number of magnetic elements, or at least two of the plurality of magnetically attractable components have different numbers of magnetic elements.

7. The charging device according to claim 1, wherein the magnetic elements include a bar magnet.

8. The charging device according to claim 7, comprising at least one of:
- the charging module comprising a first charging cooperation surface, the magnetic elements of the same magnetically attractable component being arranged side by side along a direction parallel to the first charging cooperation surface; and
- the magnetic elements of the same magnetically attractable component being arranged in a stacked manner along a direction perpendicular to the first charging cooperation surface.

9. An electronic device for use in conjunction with a charging device or another electronic device, the charging device comprising a charging module, and the electronic device comprising a charging cooperation module and a plurality of magnetically attractable cooperation components,
- wherein one or more of the magnetically attractable cooperation components form a plurality of sets of positioning cooperation modules, and each set of positioning cooperation modules forms one positioning cooperation structure of a plurality of positioning cooperation structures; each positioning cooperation structure can be positioned to cooperate with at least one type of charging devices or at least one type of electronic devices, to allow a position of the charging cooperation module to correspond to a position of the charging module, or allow positions of two charging cooperation modules to correspond to each other;
- wherein the plurality of magnetically attractable cooperation components are arranged along a peripheral direction of the charging cooperation module and spaced apart from each other;
- wherein each of the plurality of magnetically attractable cooperation components comprises a plurality of magnetic cooperation elements, and the plurality of magnetic cooperation elements of the same magnetically attractable cooperation component have the same or opposite internal magnetic field direction.

10. The electronic device according to claim 9, wherein shapes of the positioning cooperation structures of the plurality of sets of positioning cooperation modules comprise at least one of a circle, an ellipse, a rectangle, and an irregular shape.

11. The electronic device according to claim 9, wherein a third preset distance is provided between each magnetically attractable cooperation component and the charging cooperation module.

12. The electronic device according to claim 11, comprising at least one of:
- the magnetically attractable cooperation components being evenly distributed along the peripheral direction of the charging cooperation module; and
- the third preset distance between each magnetically attractable cooperation component and the charging cooperation module being identical.

13. The electronic device according to claim 9, wherein a fourth preset distance is provided between adjacent magnetically attractable cooperation components.

14. The electronic device according to claim 9, wherein the magnetically attractable cooperation component comprises at least one magnetic cooperation element; each magnetically attractable cooperation component has the same number of magnetic cooperation elements, or at least two magnetically attractable cooperation components have different numbers of magnetic cooperation elements.

15. The electronic device according to claim 9, wherein the magnetic cooperation elements comprises a bar magnet.

16. The electronic device according to claim 9, comprising at least one of:
- the charging cooperation module comprising a second charging cooperation surface, the plurality of magnetic cooperation elements of the same magnetically attractable cooperation component being arranged side by side in a direction parallel to the second charging cooperation surface; and
- the plurality of magnetic cooperation elements of the same magnetically attractable cooperation component being arranged in a stacked manner along a direction perpendicular to the second charging cooperation surface.

17. A charging system comprising at least one of:
- a charging device comprising a charging module and a plurality of magnetically attractable components arranged along a peripheral direction of the charging module and spaced apart from each other; and
- an electronic device comprising a charging cooperation module and a plurality of magnetically attractable cooperation components arranged along a peripheral direction of the charging cooperation module and spaced apart from each other,
- wherein one or more of the plurality of magnetically attractable components form a plurality of sets of positioning modules, and each set of positioning modules forms one positioning structure of a plurality of positioning structures; each positioning structure can be positioned to cooperate with at least one type of electronic devices, to allow a position of the charging module to correspond to a position of the charging cooperation module;
- wherein one or more of the magnetically attractable cooperation components form a plurality of sets of positioning cooperation modules, and each set of positioning cooperation modules forms one positioning cooperation structure of a plurality of positioning cooperation structures; each positioning cooperation structure can be positioned to cooperate with at least one type of charging devices or at least one type of electronic devices, to allow the position of the charging cooperation module to correspond to the position of the charging module, or allow positions of two charging cooperation modules to correspond to each other;
- wherein each of the plurality of magnetically attractable components comprises a plurality of magnetic elements in contact with each other, and the plurality of magnetic elements of the same magnetically attractable component have the same or opposite internal magnetic field direction;
- wherein each of the plurality of magnetically attractable cooperation components comprises a plurality of magnetic cooperation elements, and the plurality of magnetic cooperation elements of the same magnetically attractable cooperation component have the same or opposite internal magnetic field direction.

* * * * *